United States Patent
Parker et al.

(10) Patent No.: US 10,473,149 B2
(45) Date of Patent: Nov. 12, 2019

(54) PIVOT JOINT ASSEMBLY FOR VEHICLE STEERING AND SUSPENSION SYSTEMS

(71) Applicant: Federal-Mogul Motorparts Corporation, Southfield, MI (US)

(72) Inventors: Glen C. Parker, St. Peters, MO (US); Eric M. Kopsie, Bethalto, IL (US)

(73) Assignee: Federal-Mogul Motorparts LLC, Southfield, MI (US)

(*) Notice: Subject to any disclaimer, the term of this patent is extended or adjusted under 35 U.S.C. 154(b) by 294 days.

(21) Appl. No.: 15/458,164

(22) Filed: Mar. 14, 2017

(65) Prior Publication Data

US 2018/0266479 A1     Sep. 20, 2018

(51) Int. Cl.
| | |
|---|---|
| *F16C 11/06* | (2006.01) |
| *F16J 3/04* | (2006.01) |
| *B62D 7/16* | (2006.01) |
| *F16C 11/04* | (2006.01) |

(52) U.S. Cl.
CPC ............. *F16C 11/068* (2013.01); *B62D 7/16* (2013.01); *F16C 11/0671* (2013.01); *F16J 3/046* (2013.01); *F16C 11/04* (2013.01); *F16C 11/0695* (2013.01); *F16C 2326/05* (2013.01)

(58) Field of Classification Search
CPC ... F16C 11/04; F16C 11/0623; F16C 11/0671; F16C 11/0676; F16C 11/068; F16C 11/0695; F16C 2326/05; F16D 2003/846; F16D 2300/06; F16J 3/046; F16J 15/162; F16J 15/164; F16J 15/52; Y10T 403/32713; Y10T 403/32721; Y10T 403/32726; Y10T 403/32786; Y10T 403/32737

USPC ......... 403/132–135, 141; 277/552, 634–636; 74/18–18.2

See application file for complete search history.

(56) References Cited

U.S. PATENT DOCUMENTS

| | | | |
|---|---|---|---|
| 2,559,857 A | 7/1951 | Edwards | |
| 2,993,717 A * | 7/1961 | Gottschald | F16C 11/06 403/133 |
| 3,027,182 A * | 3/1962 | Reuter | F16C 11/0671 403/134 |
| 3,403,932 A | 10/1968 | Kutcher | |
| 3,449,021 A | 6/1969 | Palen | |
| 3,476,417 A | 11/1969 | Born et al. | |
| 3,596,915 A | 8/1971 | Snidar | |
| 4,154,546 A | 5/1979 | Merrick et al. | |
| 4,331,367 A * | 5/1982 | Trudeau | F16C 23/045 403/133 |

(Continued)

FOREIGN PATENT DOCUMENTS

FR     2771148 A1 *   5/1999  ............... F16J 3/046

*Primary Examiner* — Josh Skroupa
(74) *Attorney, Agent, or Firm* — Robert L. Stearns; Dickinson Wright, PLLC

(57) ABSTRACT

The pivot joint assembly includes a housing with an inner wall that surrounds an inner bore which extends along a central axis. A stud is partially received in the inner bore, projects out of one axial end of the housing and is rotatable relative to the housing about the central axis. A sealing body, which is made of a single piece of a semi-rigid material, is in a static sealing condition with the housing and is in a dynamic sealing condition with the stud. The sealing body includes a portion which extends at an acute angle relative to the central axis to contact the stud such that the portion is deflectable to allow lubricant to escape the inner bore during greasing.

17 Claims, 8 Drawing Sheets

(56) References Cited

U.S. PATENT DOCUMENTS

| | | | |
|---|---|---|---|
| 5,066,159 A * | 11/1991 | Urbach | F16C 11/0671 |
| | | | 277/635 |
| 5,312,200 A | 5/1994 | Buhl et al. | |
| 5,489,161 A | 2/1996 | Sugita et al. | |
| 5,601,378 A * | 2/1997 | Fukukawa | F16C 11/0671 |
| | | | 277/635 |
| 6,102,604 A * | 8/2000 | Maughan | F16D 3/845 |
| | | | 403/134 |
| 6,736,565 B2 | 5/2004 | Tamatsu et al. | |
| 7,097,004 B2 * | 8/2006 | Barrett | F16J 3/046 |
| | | | 277/552 |
| 7,115,036 B2 * | 10/2006 | Masuda | F16D 3/845 |
| | | | 464/173 |
| 7,229,356 B2 * | 6/2007 | Iwano | F16D 3/845 |
| | | | 464/173 |
| 7,670,078 B2 | 3/2010 | Elterman et al. | |
| 7,677,982 B2 * | 3/2010 | Compau | F16J 3/046 |
| | | | 464/173 |
| 7,704,007 B2 | 4/2010 | Elterman et al. | |
| D633,183 S | 2/2011 | Heintzman | |
| 8,235,395 B2 * | 8/2012 | Cermak | F16D 3/845 |
| | | | 277/552 |
| 8,834,279 B2 * | 9/2014 | Oh | F16D 3/843 |
| | | | 464/173 |
| 9,249,884 B2 * | 2/2016 | Jonsson | F16J 15/164 |
| 9,296,271 B2 * | 3/2016 | Mevorach | F16C 11/0685 |
| 2017/0276169 A1 * | 9/2017 | Parker, Jr. | F16J 3/046 |
| 2018/0119748 A1 * | 5/2018 | Cassell | F16J 3/046 |

* cited by examiner

PIVOT JOINT ASSEMBLY FOR VEHICLE STEERING AND SUSPENSION SYSTEMS

BACKGROUND OF THE INVENTION

1. Field of the Invention

The present invention relates generally to vehicle steering and suspension systems and more particularly to pivot joints for vehicle steering and suspension systems.

2. Related Art

Many vehicle steering assemblies include a one or more pivot joints which facilitate relative rotation between two steering components (such as a center link and a Pittman arm or an idler arm). Such pivot joints typically include a housing which is fitted with one of the steering components and a stud that is receives in the housing and projects outwardly therefrom to connect with the other steering component. An elastic boot made of a rubber or rubber-like elastic material is secured to a machined portion of an outer surface of the housing, the stud and the second steering component to keep a lubricant, such as grease, within and to keep contaminants (such as water or debris) out of the pivot joint.

SUMMARY OF THE INVENTION AND ADVANTAGES

One aspect of the present invention is related to a pivot joint assembly which includes a housing with an inner wall that surrounds an inner bore which extends along a central axis. A stud is partially received in the inner bore, projects out of one axial end of the housing and is rotatable relative to the housing about the central axis. A sealing body, which is made of a single piece of a semi-rigid material, is in a static sealing condition with the housing and is in a dynamic sealing condition with the stud. The sealing body includes a portion which extends at an acute angle relative to the central axis to contact the stud such that the portion is deflectable to allow lubricant to escape the inner bore during greasing.

The semi-rigid polymeric material of the sealing body provides for improved crack resistance and durability than the elastic boots of other known pivot bodies. Also tapered portion of the sealing body functions as a check valve to allow excess grease to escape an interior of the pivot joint assembly in one direction but to prevent contaminants from entering the pivot joint assembly in an opposite direction. This is advantageous because the amount of grease injected into the inner bore of the housing does not have to be specifically controlled to avoid overfilling or underfilling the pivot joint assembly as is the case for other known pivot joint assemblies. Instead, an assembler or a mechanic simply has to inject the grease into the housing until he or she sees grease escaping from between the sealing body and the stud. This leads to reduced manufacturing and maintenance costs and improved reliability and durability of the pivot joint assembly.

According to another aspect of the present invention, the sealing body is in direct surface-to-surface contact with the inner wall of the housing to establish the static sealing condition between the sealing body and the housing.

According to yet another aspect of the present invention, the inner wall of the housing includes a machined surface that is in surface-to-surface contact with the sealing body.

According to still another aspect of the present invention, the pivot joint assembly further includes a biasing element which is disposed in the inner bore of the housing and biases the sealing body against the inner wall of the housing to improve the static sealing condition between the sealing body and the housing.

According to a further aspect of the present invention, the portion of the sealing body that contacts the stud is a tapered portion, the housing includes a radially inwardly extending lip adjacent one axial end of the inner bore, the sealing body includes a flange portion, and the surface-to-surface contact between the sealing body and the inner wall of the housing is between the flange portion of the sealing body and the radially inwardly extending lip.

According to yet a further aspect of the present invention, the sealing body includes an axially extending portion which extends axially from the flange portion to the tapered portion and which is spaced from the stud to present an annularly shaped gap.

According to still a further aspect of the present invention, the pivot joint assembly further includes at least one bearing received in the inner bore of the housing and in contact with the stud for allowing free rotation of the stud about the central axis and for restricting articulation of the stud relative to the housing.

According to another aspect of the present invention, the housing presents a radially inwardly extending lip adjacent one axial end of the inner bore, and the flange portion of the sealing body is sandwiched between the inwardly extending lip and the at least one bearing.

According to yet another aspect of the present invention, the acute angle of the portion of the sealing body in contact with the stud relative to the central axis is approximately forty-five degrees.

Another aspect of the present invention is related to a method of making a pivot joint assembly. The method includes the step of preparing a housing with an inner wall that surrounds an inner bore which extends along a central axis. The method continues with the step of inserting at least a portion of a sealing body that is made of a single piece of a semi-rigid material into the inner bore. The method proceeds with the step of inserting a stud into the inner bore of the housing and supporting the stud such that the stud is freely rotatable relative to the housing about the central axis. The method continues with the step of establishing a static sealing condition between the sealing body and the housing. The method proceeds with the step of establishing a dynamic sealing condition between a portion of the sealing body which extends at an acute angle relative to the central axis and the stud. The method continues with the step of injecting a lubricant into the inner bore of the housing. The method proceeds with the step of resiliently deflecting the portion of the sealing body to allow excess lubricant to escape the inner bore.

According to another aspect of the present invention, the housing includes a radially inwardly extending lip adjacent one axial end of the inner bore, and the sealing body has a flange portion which is in surface-to-surface contact with the radially inwardly extending lip to establish the static sealing condition between the sealing body and the housing.

According to yet another aspect of the present invention, the method further includes the step of machining the inner wall of the housing at the radially inwardly extending lip before the steps of inserting the stud and sealing body into the inner bore.

According to still another aspect of the present invention, the method further includes the step of inserting at least one bearing into the inner bore before the step of inserting the stud into the inner bore.

According to a further aspect of the present invention, the method further includes the step of inserting a biasing element into the inner bore to bias a flat surface of the at least one bearing against the flange portion of the sealing body to improve the static sealing condition between the sealing body and the housing.

According to yet a further aspect of the present invention, the method further includes the step of closing one of the ends of the inner bore of the housing with an end cap.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DETAILED DESCRIPTION OF THE ENABLING EMBODIMENTS

Figure 1:
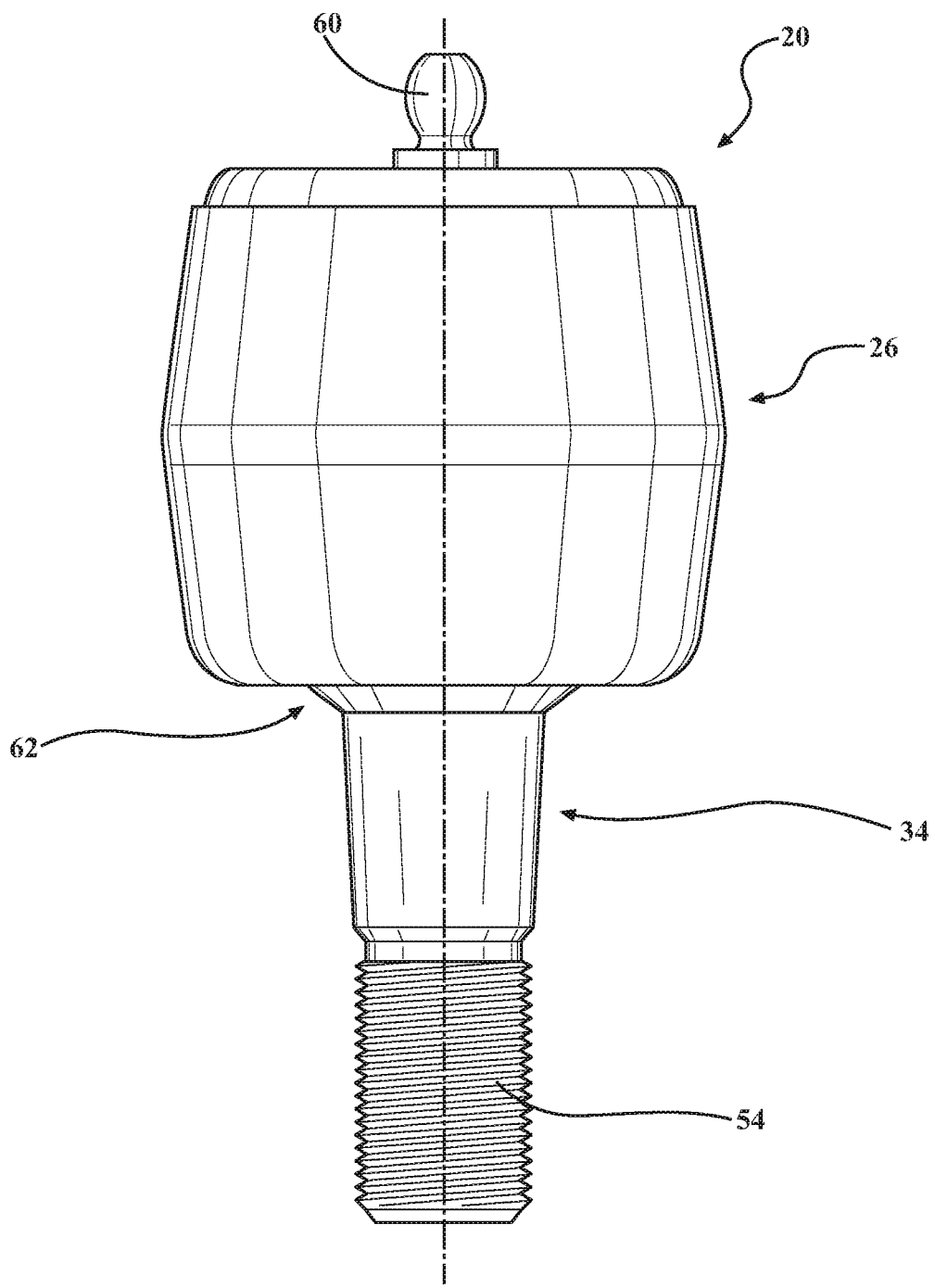
FIG. 1 is a front elevation view of a first exemplary embodiment of the pivot joint assembly.
Figure 2:
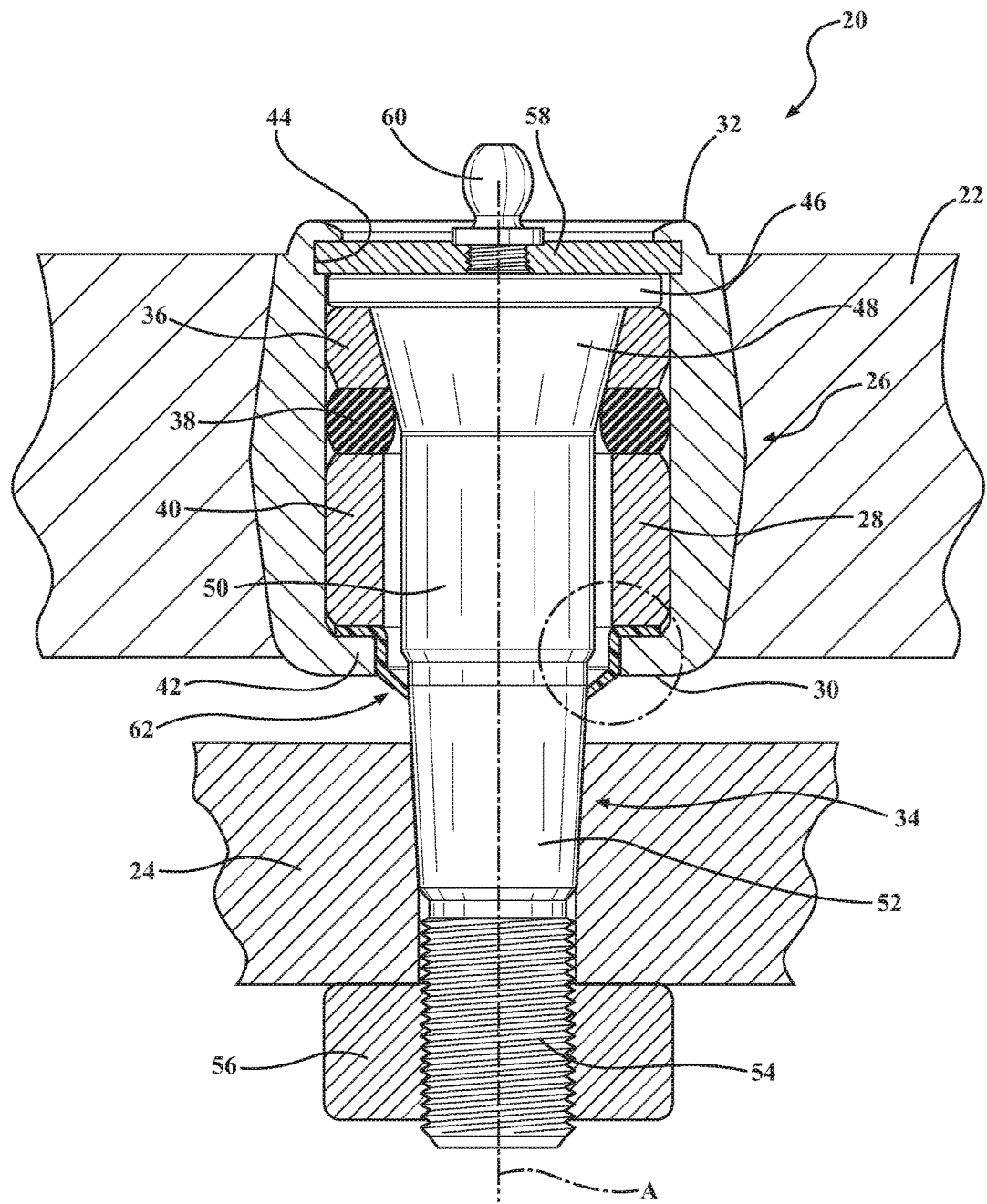
FIG. 2 is a view of the first exemplary embodiment of the pivot joint assembly and shown in connection with first and second steering components with a stud and a Zerk fitting of the pivot joint assembly being shown in elevation and the remaining components being shown in cross-section.

Referring to the Figures, wherein like numerals indicate corresponding parts throughout the several views, a first exemplary embodiment of a pivot joint assembly 20 for use in a vehicle steering system is generally shown in FIG. 1. As shown in FIG. 2, in use, the pivot joint assembly 20 interconnects a first steering component 22 (such as a steering box or a steering shaft) with a second steering component 24 (such as a center link or a drag link) to these components to rotate relative to one another during operation of the vehicle, such as when a driver turns a steering wheel in the vehicle.

Referring still to FIG. 2, the pivot joint assembly 20 includes a housing 26 that is received into an opening of the first steering component 22 and that has an inner wall 28 which surrounds a generally cylindrically shaped inner bore which extends along a central axis A between open first and second ends 30, 32. A stud 34 is partially received in the inner bore and projects out of the open first end 30 for attachment with the second steering component 24. One or more bearings 36, 38, 40 are also received in the inner bore of the housing 26 to provide a low friction interface with the stud 34, thereby allowing the stud 34 to freely rotate relative to the housing 26 about the central axis A. The bearings 36, 38, 40 also to restrict, or substantially prevent, articulation of the stud 34 relative to the housing 26.

Adjacent the open first end 30, the housing 26 presents a radially inwardly extending lip 42 with a machined upper surface, and adjacent the open second end 32, the inner wall 28 presents a circumferentially extending groove 44. The bearings 36, 38, 40 are stacked axially on top of one another in the inner bore of the housing 26. In a radial direction, the bearings 36, 38, 40 are located between the stud 34 and the inner wall 28, and in an axial direction, the bearings 36, 38, 40 are located between the lip 42 and the groove 44. The housing 26 is preferably made of a single piece of metal (such as iron, steel, a steel alloy, aluminum, an aluminum alloy, etc.) and may be shaped through any suitable process or combination of processes including, for example, casting, machining and forging. In the exemplary embodiment, the inner wall 28, including an inwardly facing surface on the lip 42, is machined to its final form.

From one axial end to another, the stud 34 sequentially presents a stud flange 46, a first angled portion 48, a cylindrical portion 50, a second angled portion 52 and an end portion 54. The stud flange 46 is disposed in the inner bore of the housing 26 adjacent the groove 44, and the second angled portion 52 and the end portion 54 are disposed outside of the housing 26. A mechanical fastener 56 (such as a nut) locks the end portion 54 with the second steering component 24. The stud 34 is preferably made as one integral piece of metal and may be shaped through any suitable process or combination of processes including, for example, casting, forging, machining, etc.

In the exemplary embodiment, one of the bearings 38 is sandwiched between the other two bearings 36, 40 and is made of a compressible material (such as rubber or a rubber-like material) to function as a biasing element which urges the other two bearings 36, 40 in opposite axial directions. One or more of the bearings 36, 38, 40 may include lubricant grooves formed thereon for allowing the flow of lubricant throughout the inner bore of the housing 26.

A cover plate 58, which is made as a separate component from the housing 26, closes the second end 32 of the inner bore to lock the bearings 36, 38, 40 and the stud 34 in the inner bore of the housing 26. In the exemplary embodiment, the cover plate 58 is received in the groove 44 of the inner wall 28, and the second end 32 of the housing 26 is swaged to lock the cover plate 58 in place. However, it should be appreciated that the cover plate 58 could be locked with the housing 26 through any suitable retaining means. The cover plate 58 further includes a lubricant opening with a Zerk fitting 60 for conveying a lubricant (such as grease) into the inner bore of the housing 26 during initial assembly and during regular maintenance of the pivot joint assembly 20.

The pivot joint assembly 20 further includes a sealing body 62 which is made as one monolithic piece of a semi-rigid plastic material and is sealed against the housing 26 and against the stud 34 to retain lubricant within and keep contaminants out of the inner bore of the housing 26. The sealing body 62 includes a flange portion 64 that is received in the inner bore and is in surface-to-surface contact with the machined upper surface of the lip 42 to establish a static sealing condition between the sealing body 62 and the housing 26. That is, during operation, as the stud 34 rotates about the central axis A relative to the housing 26, the sealing body 62 remains fixed with the housing 26. Because the upper surface of the lip 42 is machined to its final form, the seal between the sealing body 62 and the housing 26 is especially effective and fluid tight. The sealing condition between the sealing body 62 and the stud 34 is a dynamic sealing condition because the sealing body 62 remains fixed with the housing 26 as the stud 34 rotates relative thereto. As shown, the sealing body 62 of the exemplary embodiment has a constant cross-sectional shape three hundred and sixty degrees (360°) around the central axis A. The sealing body 62 is preferably made of a polymeric material and is made through injection molding. The biasing element 38 in the inner bore applies a preload force against one of the bearings 40 to sandwich the flange portion 64 of the sealing body 62 between the bearing 40 and the machined upper surface of the lip 42 to further improve the static sealing condition between the sealing body 62 and the housing 26.

The sealing body 62 further includes an axial portion 66 which extends from a radially inner end of the flange portion 64 and extends parallel to the central axis A. An outer surface of the axial portion 66 is in surface-to-surface contact with an inner face of the lip 42 such that contaminants are restricted from getting between the axial portion 66 of the sealing body 62 and the lip 42 of the housing 26. The axial portion 66 of the sealing body 62 is spaced radially from the first cylindrical portion 50 of the stud 34 to present an annularly shaped gap such that grease fills the area between the axial portion 66 and the first cylindrical portion 50.

Figure 3:
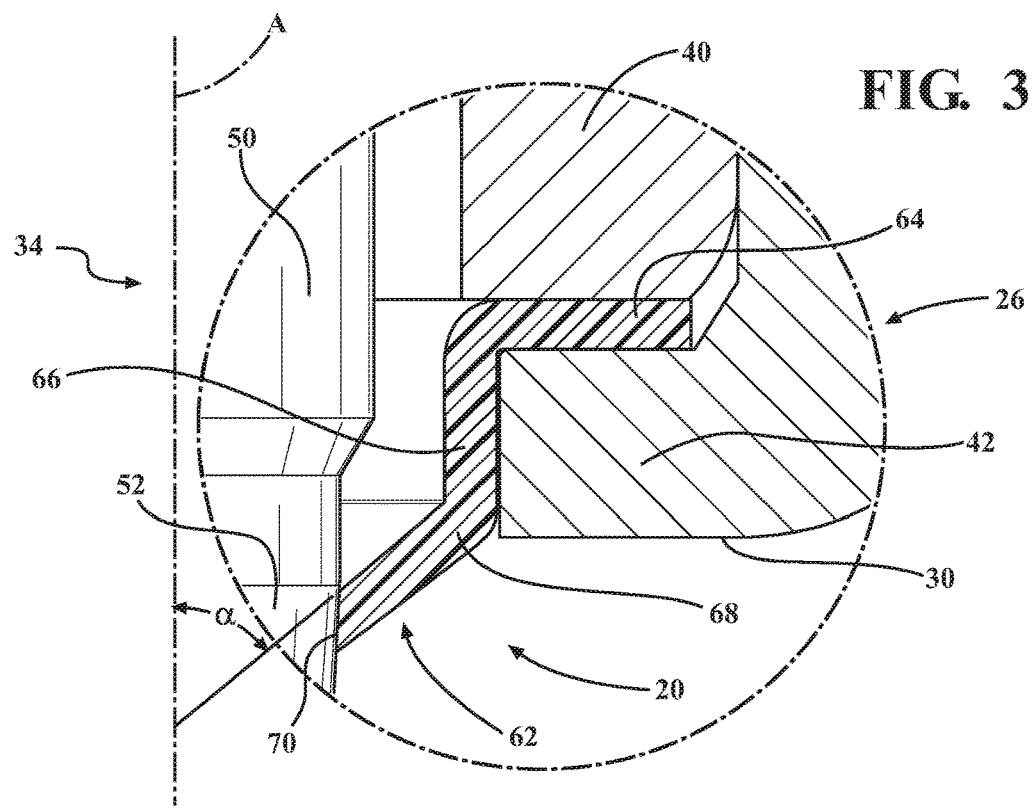
FIG. 3 is an enlarged portion of FIG. 2.

The sealing body 62 further includes a tapered portion 68 which extends from an end of the axial portion 66 at a generally constant and acute angle α relative to the central axis A to contact the second angled portion 52 of the stud 34. Specifically, the tapered portion 68 of the sealing body 62 is in an interference fit engagement with the second angled portion 52 of the stud 34 to establish the dynamic sealing engagement between the sealing body 62 and the stud 34. The generally constant angle α is preferably approximately forty-five degrees (45°). As shown in FIG. 3, an end face 70 of the tapered portion 68 is generally flat such that the contact between the sealing body 62 and the stud 34 is a surface-to-surface contact. As shown in FIG. 2, the sealing contact between the sealing body 62 and the stud 34 is outside of the inner bore of the housing 26 but is spaced axially from the second steering component 24. It should be appreciated that the tapered portion does not have to extend at a constant angle along its length. For example, the sealing body could be curved in the tapered portion so long as it meets the stud at an acute angle.

Figure 4:
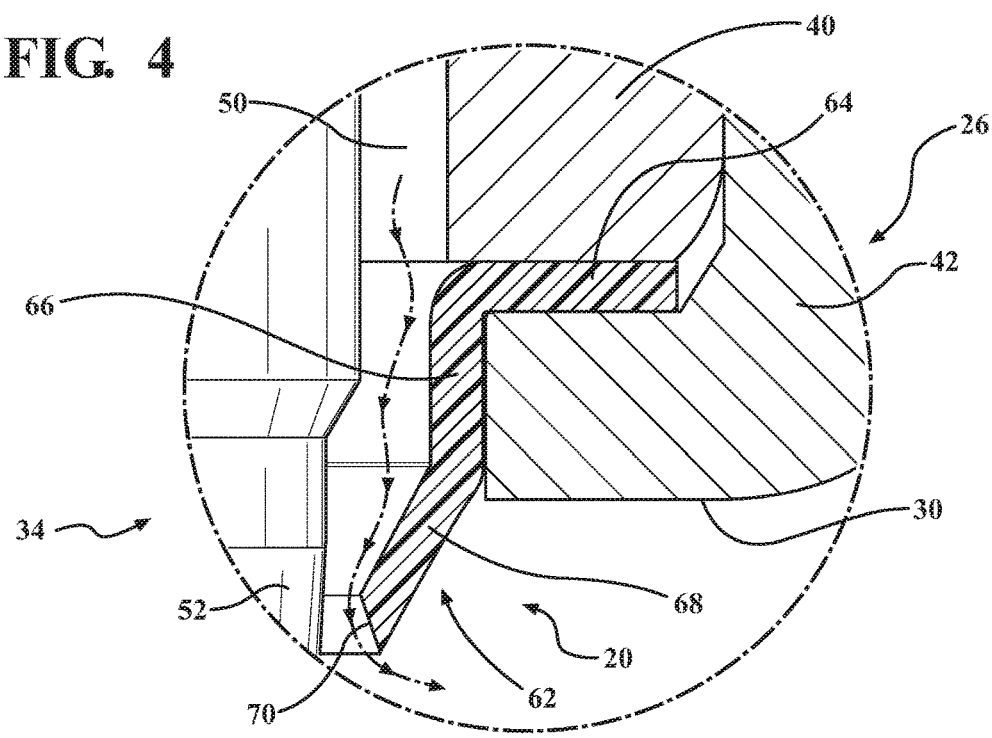
FIG. 4 is another view of the enlarged portion of FIG. 2 but showing excess lubricant escaping out of the pivot joint assembly.
Figure 5:
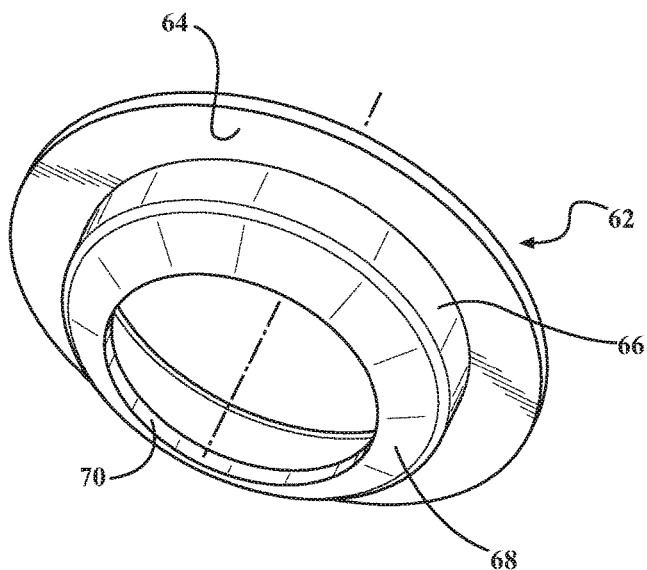
FIG. 5 is a perspective view of a sealing body of the pivot joint assembly of FIG. 1.
Figure 6:
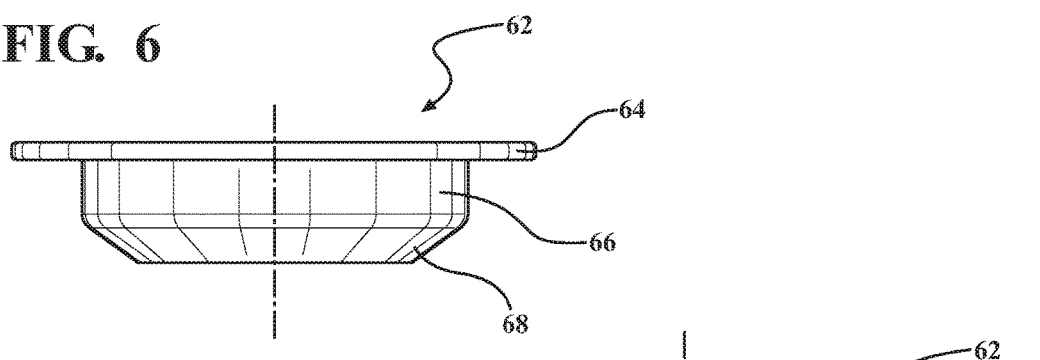
FIG. 6 is a front view of the sealing body of FIG. 5.
Figure 7:
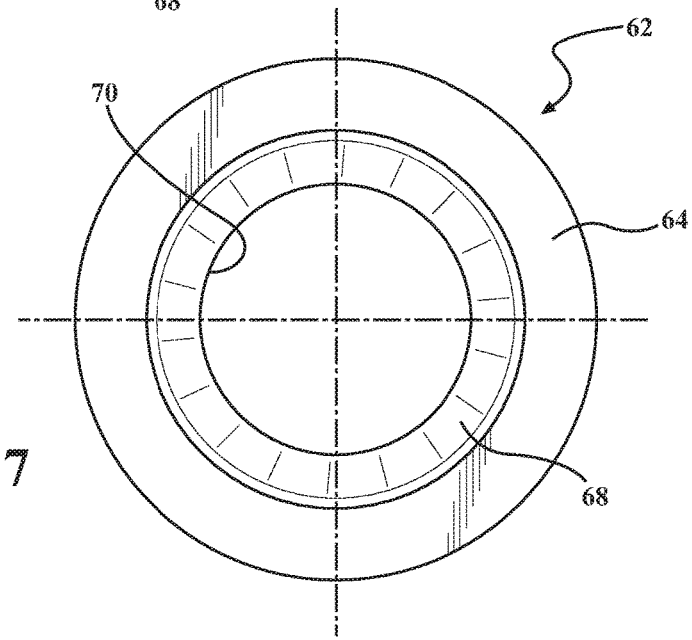
FIG. 7 is a top view of the sealing body of FIG. 5.
Figure 8:
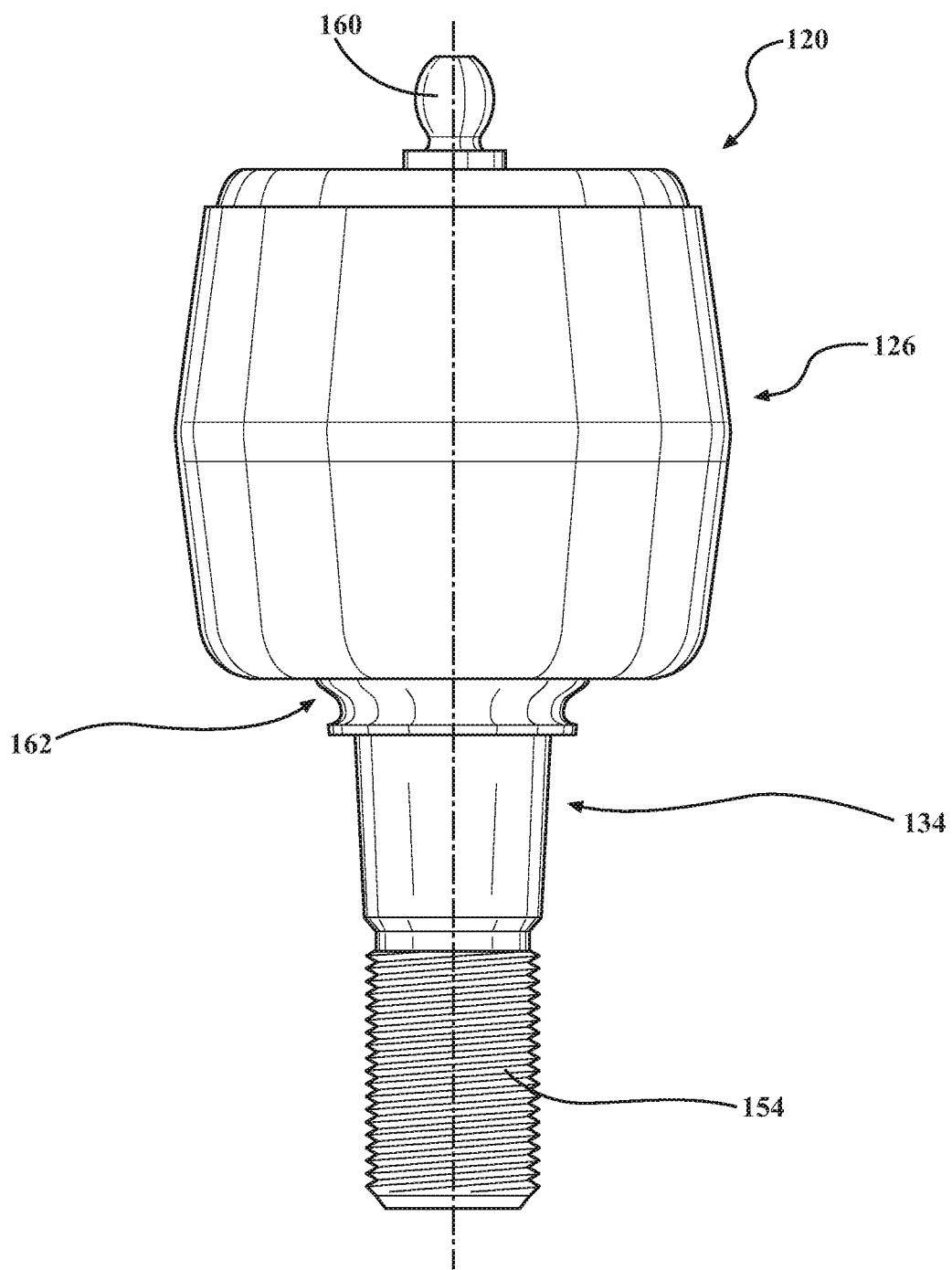
FIG. 8 is a front elevation view of a second exemplary embodiment of the pivot joint assembly.
Figure 9:
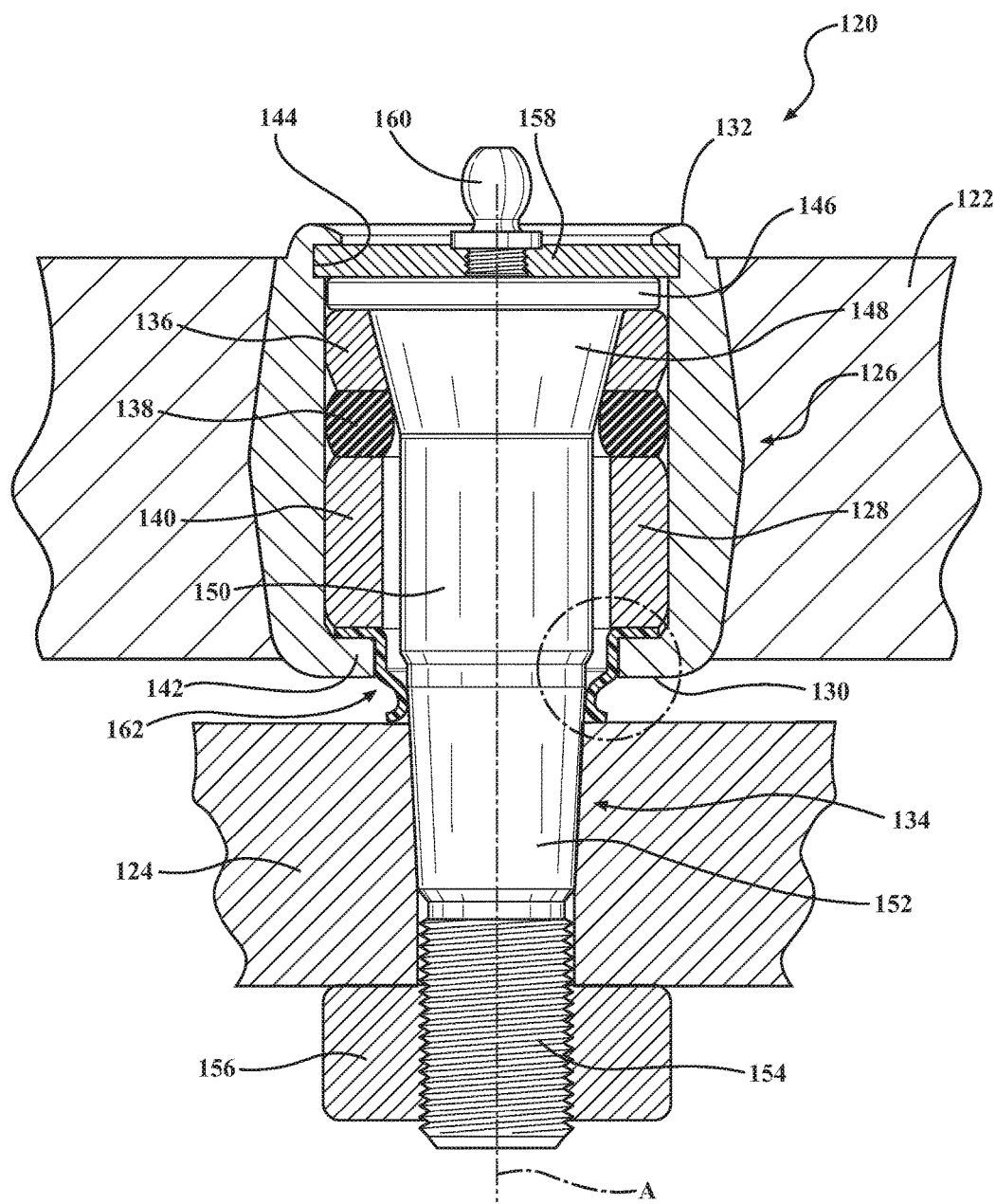
FIG. 9 is a view of the second exemplary embodiment of the pivot joint assembly and shown in connection with first and second steering components with a stud and a Zerk fitting of the pivot joint assembly being shown in elevation and the remaining components being shown in cross-section.

Referring now to FIG. 4, as grease is injected into the inner bore of the housing 26, either during initial greasing or during regreasing, when the pressure of the grease exceeds a predetermined threshold pressure, the tapered portion 68 of the sealing body 62 resiliently deflects out of contact with the stud 34 to open up a passage for excess grease to escape out of the inner bore. When the greasing operation is over, the pressure of the grease in the inner bore dissipates, causing the tapered portion 68 to automatically deflect back into the dynamic sealing condition shown in FIG. 3, i.e., the passage is closed automatically. As shown in FIGS. 3 and 4, the resilient deflection, or bending, of the sealing body 62 occurs at the location where the axial and tapered portions 66, 68 meet. Because the outer surface of the axial portion 66 is supported by the lip 42 of the housing 26, the flange and axial portions 64, 66 do not move as the tapered portion 68 of the sealing body 62 opens and closes. Accordingly, the tapered portion 68 of the sealing body 62 functions as a check valve to allow excess grease to escape the inner bore in one direction but to prevent contaminants from entering the inner bore in an opposite direction. This is advantageous because the amount of grease injected into the inner bore of the housing 62 does not have to be specifically measured to avoid overfilling or underfilling the pivot joint assembly 20 as is the case for other known pivot joint assemblies. Instead, an assembler or a mechanic simply has to inject the grease into the housing 26 until he or she sees grease escaping the inner bore from between the sealing body 62 and the stud 34. This leads to reduced manufacturing and maintenance costs and improved reliability and durability of the pivot joint assembly 20.

Another aspect of the present invention is related to a method of making a pivot joint assembly 20, such as the pivot joint assembly 20 shown in FIGS. 1-4. The method includes the step of preparing a housing 26 with an inner wall 28 that surrounds an inner bore which extends along a central axis A. The method proceeds with the step of machining the inner wall 28 of the housing 26 at a radially inwardly extending lip 42. Next, the method continues with the step of inserting at least a portion of a sealing body 62 that is made of a single piece of a semi-rigid material into the inner bore. The method proceeds with the step of inserting at least one bearing 36, 38, 40 and a biasing element 38 into the inner bore of the housing 26. The method continues with the step of inserting a stud 34 into the inner bore of the housing 26 and supporting the stud 34 with the at least one bearing 36, 38, 40 such that the stud 34 is freely rotatable relative to the housing 26 about the central axis A. The method proceeds with the step of establishing a static sealing condition between a flange portion 64 of the sealing body 62 and a radially inwardly extending lip 42 of the housing 26. The method continues with the step of establishing a dynamic sealing condition between a tapered portion 68 of the sealing body 62 which extends at an acute angle α relative to the central axis A and the stud 34. The method proceeds with the step of closing one end 30, 32 of the inner bore with a cover plate 58. The method continues with the step of injecting a lubricant (such as grease) into the inner bore of the housing 26. The method proceeds with the step of resiliently deflecting the tapered portion 68 of the sealing body 62 away from the stud 34 to allow excess lubricant to escape the inner bore.

Figure 10:
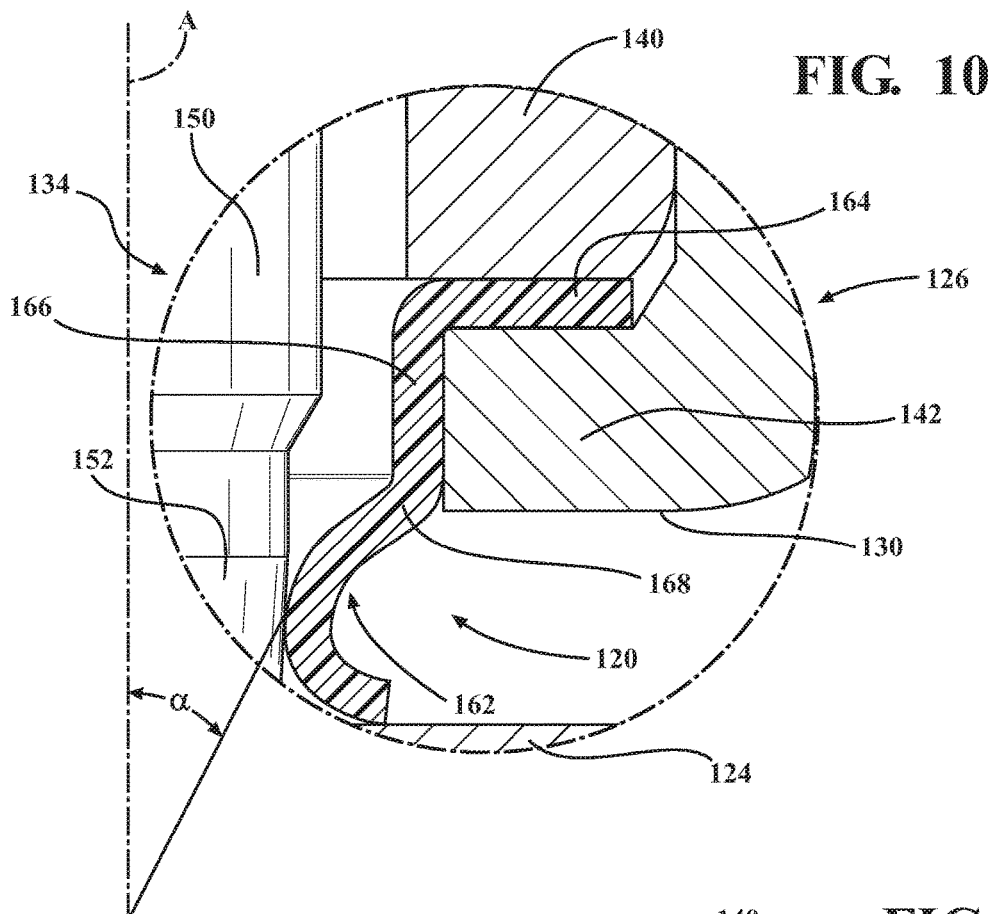
FIG. 10 is an enlarged portion of FIG. 10.
Figure 11:
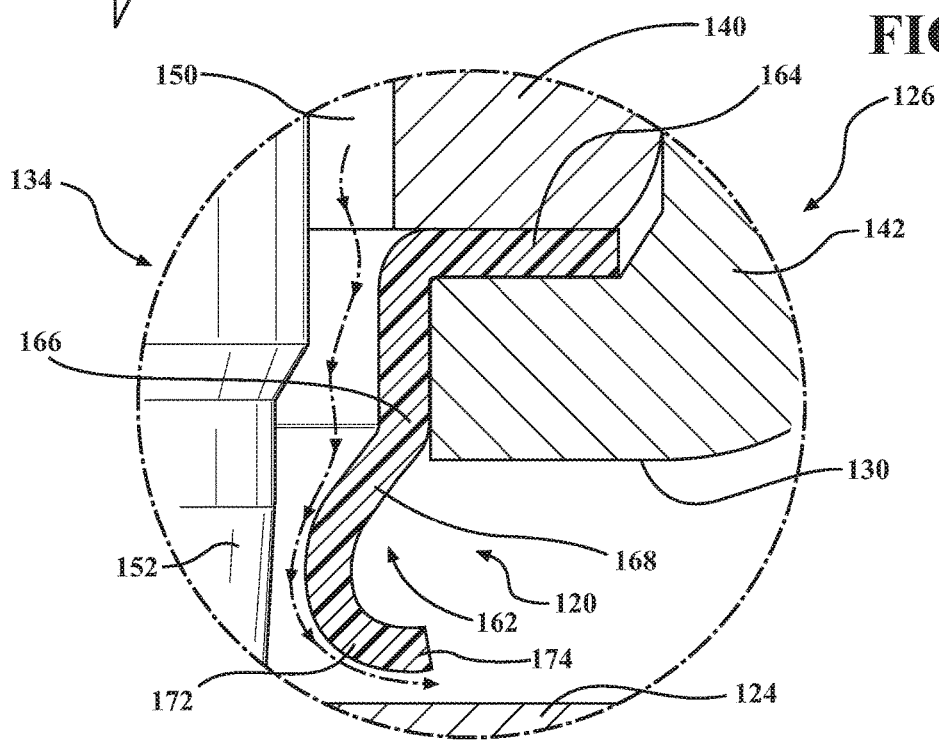
FIG. 11 is another view of the enlarged portion of FIG. 10 but showing excess lubricant escaping out of the pivot joint assembly.
Figure 12:
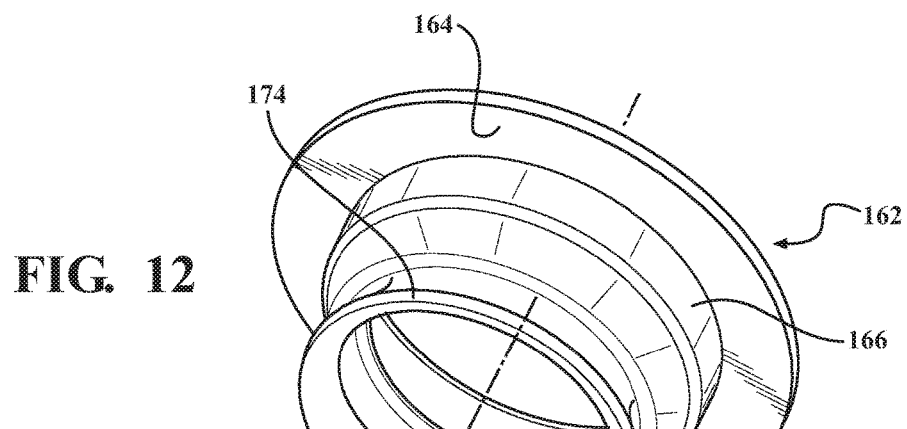
FIG. 12 is a perspective view of a sealing body of the pivot joint assembly of FIG. 8.
Figure 13:
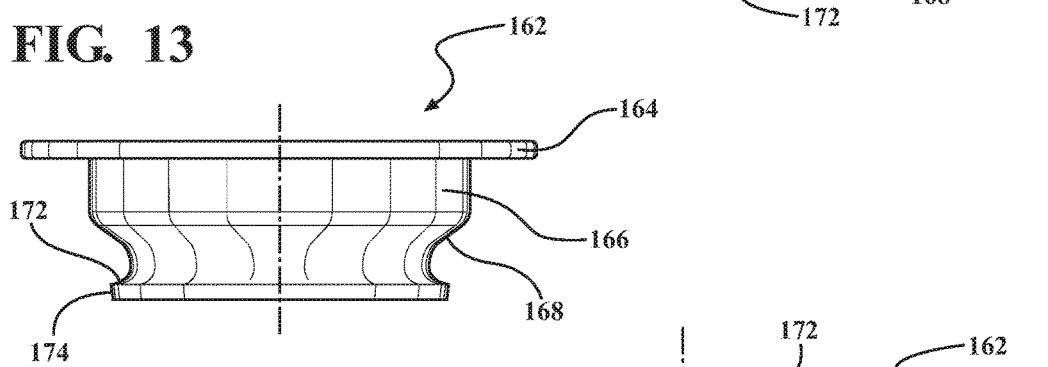
FIG. 13 is a front view of the sealing body of FIG. 12.
Figure 14:
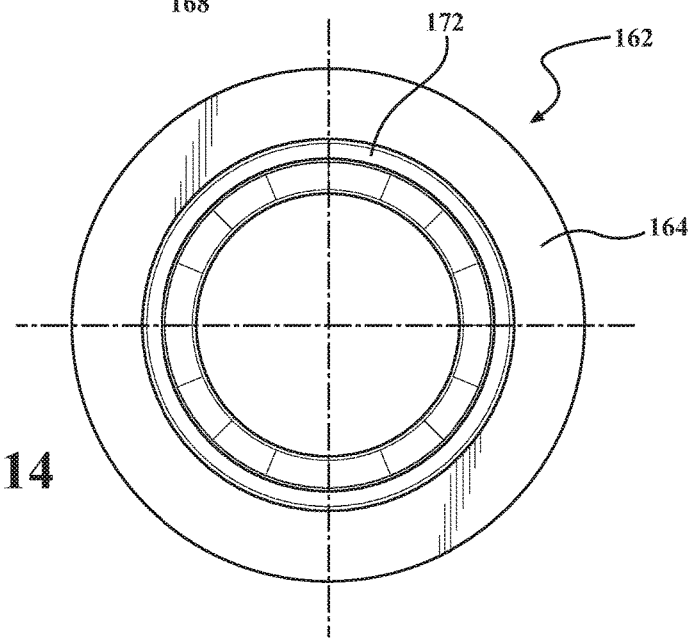
FIG. 14 is a top view of the sealing body of FIG. 12.

Referring now to FIGS. 8-14, a second exemplary embodiment of the pivot joint assembly 120 is generally shown with like numerals, separated by a prefix of "1" indicating corresponding parts with the first exemplary embodiment described above. The main distinguishing feature in the second embodiment distinguishes is a secondary seal portion 172 which extends from the tapered portion 168 and curves radially away from the stud 134 to a distal end 174. As shown, the distal end 174 is perpendicular or nearly perpendicular to the central axis A. As shown in FIG. 10, when installed, the distal end 174 of the secondary seal portion 172 is in surface-to-surface contact with the second steering component 124 to establish a dynamic seal between the sealing body 162 and the second steering component 124. As such, the second embodiment of the sealing body 162 has two seals that restrict the entrance of contaminants into the interior of the pivot joint assembly 120: one with the stud 134 and one with the second steering component 124. As shown in FIG. 11, when lubricant is injected into the housing 126, both of these seals resiliently open up to allow excess lubricant to escape out of the pivot joint assembly 120. Once the excess lubricant has escaped, the sealing body 162 springs back to the position shown in FIG. 10.

Obviously, many modifications and variations of the present invention are possible in light of the above teachings. It is, therefore, to be understood that within the scope of the appended claims, the invention may be practiced otherwise than specifically described. It should also be appreciated that the terms "upper" and "lower" are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A pivot joint assembly, comprising:
    a housing with an inner wall that surrounds an inner bore which extends along a central axis;
    a stud that is partially received in said inner bore and projects out of one end of said housing and is rotatable relative to said housing about said central axis; and
    a sealing body made of a single piece of a material, said sealing body being in a static sealing condition with said housing and in a dynamic sealing condition with said stud, and said sealing body including a portion which extends at an acute angle relative to said central axis to contact said stud such that said portion is deflectable to allow lubricant to escape said inner bore during greasing; and
    wherein said portion of said sealing body that contacts said stud has a constant shape three hundred and sixty degrees around said central axis.

2. The pivot joint assembly as set forth in claim 1, wherein said sealing body is in direct surface-to-surface contact with an inwardly extending surface of said inner wall of said housing to establish said static sealing condition between said sealing body and said housing.

3. The pivot joint assembly as set forth in claim 2, wherein said inner wall of said housing includes a machined surface that is in surface-to-surface contact with said sealing body.

4. The pivot joint assembly as set forth in claim 3, further including a biasing element disposed in said inner bore of said housing and biasing said sealing body against said inner wall of said housing.

5. The pivot joint assembly as set forth in claim 2 wherein said portion of said sealing body that contacts said stud is a tapered portion and wherein said housing includes a radially inwardly extending lip adjacent one axial end of said inner bore and wherein said sealing body includes a flange portion and wherein said surface-to-surface contact between said sealing body and said inner wall is between said flange portion of said sealing body and said radially inwardly extending lip.

6. The pivot joint assembly as set forth in claim 5 wherein said sealing body further includes an axially extending portion which extends axially from said flange portion to said tapered portion and wherein said axially extending portion is spaced from said stud to present an annularly shaped gap.

7. The pivot joint assembly as set forth in claim 5 further including at least one bearing received in said inner bore of said housing and in contact with said stud and allowing free rotation of said stud about said central axis and preventing articulation of said stud relative to said housing.

8. The pivot joint as set forth in claim 1 wherein said acute angle of said portion of said sealing body in contact with said stud relative to said central axis is approximately forty-five degrees.

9. The pivot joint as set forth in claim 1 wherein said portion of said sealing body in contact with said stud is a tapered portion and wherein said sealing body further includes a secondary sealing portion which extends from said tapered portion to a distal end which extends generally perpendicularly to said central axis.

10. The pivot joint as set forth in claim 1 wherein said portion of said sealing body is in direct, surface-to-surface contact with said stud.

11. A method of making a pivot joint assembly, comprising the steps of:
    preparing a housing with an inner wall that surrounds an inner bore which extends along a central axis;
    inserting at least a portion of a sealing body that is made of a single piece of a material into the inner bore;
    inserting a stud into the inner bore of the housing and supporting the stud such that the stud is rotatable relative to the housing about the central axis;
    establishing a static sealing condition between the sealing body and the housing;
    establishing a dynamic sealing condition between a portion of the sealing body which extends at an acute angle relative to the central axis and the stud and whereby the portion of the sealing body has a constant shape three hundred and sixty degrees around the central axis;
    injecting a lubricant into the inner bore of the housing; and
    resiliently deflecting the portion of the sealing body to allow excess lubricant to escape the inner bore.

12. The method as set forth in claim 11, wherein the housing includes a radially inwardly extending lip adjacent one axial end of said inner bore and wherein said sealing body has a flange portion which is in surface to surface contact with said radially inwardly extending lip to establish the static sealing condition between the sealing body and the housing.

13. The method as set forth in claim 12, further including the step of machining the inner wall of the housing at the radially inwardly extending lip before the steps of inserting the stud and sealing body into the inner bore.

14. The method as set forth in claim 13, further including the step of inserting at least one bearing into the inner bore before the step of inserting the stud into the inner bore.

15. The method as set forth in claim 14, further including the step of inserting a biasing element into the inner bore to bias a flat surface of said at least one bearing against the flange portion of the sealing body such that the static sealing condition between the sealing body and the housing is improved.

16. The method as set forth in claim 15 further including the step of closing one end of the inner bore of the housing with a cover plate.

17. The method as set forth in claim 11 wherein the portion of the sealing body is in direct, surface-to-surface contact with the stud.

* * * * *